United States Patent [19]

Spellman et al.

[11] Patent Number: 5,606,238
[45] Date of Patent: Feb. 25, 1997

[54] DISCRIMINATING BATTERY CHARGING SYSTEM

[75] Inventors: Patrick J. Spellman, Middleton; El-Sayed A. Megahed; Karl E. Anderson, both of Madison; Bryan D. Jaedike, Sauk City, all of Wis.

[73] Assignee: Rayovac Corporation, Madison, Wis.

[21] Appl. No.: 278,505

[22] Filed: Jul. 21, 1994

[51] Int. Cl.⁶ .............................. H01M 10/46; H02J 7/00
[52] U.S. Cl. .................................. 320/2; 320/3; 429/100
[58] Field of Search .......................... 320/2, 3; 429/65, 429/100, 167

[56] References Cited

U.S. PATENT DOCUMENTS

| | | | |
|---|---|---|---|
| 3,391,321 | 2/1968 | Ota | 320/2 |
| 3,579,075 | 5/1971 | Floyd | 320/2 |
| 4,147,838 | 4/1979 | Leffingwell | 429/1 |
| 4,403,182 | 9/1983 | Yeh | 320/2 |
| 4,489,268 | 12/1984 | Beachy | 320/2 |
| 4,577,144 | 3/1986 | Hodgeman et al. | 320/2 |
| 4,577,145 | 3/1986 | Mullersman | 320/2 |
| 4,602,202 | 7/1986 | Mandscheak et al. | 320/2 |
| 4,628,243 | 12/1986 | Hodgman et al. | 320/2 |
| 4,645,996 | 2/1987 | Toops | 320/2 |
| 4,816,735 | 3/1989 | Cook et al. | 320/2 |
| 5,038,093 | 8/1991 | Edwards et al. | 320/2 |
| 5,057,761 | 10/1991 | Felegyhazi, Sr. | 320/2 |
| 5,108,847 | 4/1992 | Edwards et al. | 429/7 |
| 5,443,924 | 8/1995 | Spellman | 429/65 |

*Primary Examiner*—Edward H. Tso
*Attorney, Agent, or Firm*—Foley & Lardner

[57] ABSTRACT

A battery, a battery charger, and a battery charging system are used for charging cylindrical batteries having a certain predetermined feature. The battery charger has at least one compartment having first and second circular recesses provided at the rear wall of the at least one compartment for engaging the cathode terminals of batteries having the predetermined feature of a first and second size respectively, wherein the recesses are of such dimensions as to receive the cathode terminals of batteries having the predetermined feature, but not the cathode terminals of conventional, prior art primary and secondary batteries not having this feature. It provides a safe, easy to use, low cost battery charging system that will not charge undesired primary or secondary batteries.

10 Claims, 5 Drawing Sheets

DISCRIMINATING BATTERY CHARGING SYSTEM

FIELD OF THE INVENTION

The present invention relates to a battery charging system comprising a battery charger and a battery, wherein only a secondary battery having a particular predetermined feature will be accepted and charged by the battery charger.

BACKGROUND OF THE INVENTION

For greater convenience and portability many modern electrical appliances and consumer products may be operated to draw electric current from dry cells (commonly referred to as "batteries") of standard size and electrical performance. For convenience and economy, various rechargeable, or secondary, batteries have been developed. A number of chargers, operating off of household current, have been developed to charge those rechargeable batteries. Due to differences in chemistry, however, nonrechargeable, or primary, batteries such as zinc-carbon or manganese dioxide alkaline batteries may leak, discharge gasses, or in some cases rupture, if subjected to a recharging current. Thus, for safety purposes, battery charges should be provided with a means for discriminating between batteries which may be safely recharged therein, and those which may not.

Several prior art disclosures suggest different means for discriminating between batteries which should and should not be charged, including:

| Country | Pat. No. | Inventor | Year of Issue |
|---------|----------|----------|---------------|
| U.S.A. | 3,391,321 | Ota | 1968 |
| U.S.A. | 3,579,075 | Floyd | 1971 |
| U.S.A. | 4,147,838 | Leffingwell | 1979 |
| U.S.A. | 4,303,182 | Yeh | 1983 |
| U.S.A. | 4,489,268 | Beachy | 1984 |
| U.S.A. | 4,577,144 | Hodgman et al. | 1986 |
| U.S.A. | 4,577,145 | Mullersman | 1986 |
| U.S.A. | 4,602,202 | Mundschenk et al. | 1986 |
| U.S.A. | 4,628,243 | Hodgman et al. | 1986 |
| U.S.A. | 4,645,996 | Toops | 1987 |
| U.S.A. | 4,816,735 | Cook et al. | 1989 |
| U.S.A. | 5,038,093 | Edwards et al. | 1991 |
| U.S.A. | 5,057,761 | Felegyhazi et al. | 1991 |
| U.S.A. | 5,108,847 | Edwards et al. | 1992 |

Certain known chargers prevent battery charging accidents by providing the chargers with electrical circuits capable of distinguishing between batteries which should and should not be charged. Distinguishing electrical circuits within chargers are undesirable due to the extensive effort required to develop them, and the relative difficulty and high cost of manufacturing such circuits and batteries therefor.

Other known battery chargers provide compatible rechargeable batteries with predetermined features such as specialized cathode or anode terminals, recesses, keyways, or conductive rings disposed about the battery that enable the battery charger to discriminate between batteries that should and should not be charged.

U.S. Pat. No. 3,391,321 discloses a battery charger having sliding contacts for engaging the positive terminals of batteries charged therein.

U.S. Pat. No. 3,579,075 discloses a battery charger for charging AA, C or D size batteries. The battery charger uses a combination of positive contact recesses disposed in the sidewall thereof and battery support means disposed therein to discriminate between batteries of different sizes. Each positive contact recess is positioned at a particular height above the battery support means to receive a battery of a predetermined size. Depending on the size battery inserted in the charger, the battery engages only the positive and negative contacts of the battery charging circuit to which its size corresponds. Thus, the charger supplies varying amounts of charging current to AA, C, and D size batteries. The charger does not discriminate between primary and secondary batteries, however.

U.S. Pat. No. 4,147,838 discloses a rechargeable battery having a special charging contact. The rechargeable battery is used in a compatible appliance, the appliance having the battery charger incorporated therein. The charger supplies charging current only to rechargeable batteries having the special charging contact. The special contact is physically distinct and separate from the two power terminals of the battery.

U.S. Pat. No. 4,403,182 discloses a battery charger having means for preventing the charging of batteries placed in an improper, reverse orientation therein. Such means comprise a support structure for accepting and holding batteries, and contact elements disposed at different radial offsets in respect of the central longitudinal axes of cylindrical batteries placed therein, the offsets being determined by the size of the battery to be charged.

U.S. Pat. No. 4,577,144 discloses a charger capable of distinguishing rechargeable batteries from non-rechargeable batteries. This charger incorporates a sensing means in the charger for sensing at least one inherent parameter, such as the low frequency impedance of a rechargeable battery demonstrated during charging. Such a parameter has a value for secondary batteries that is distinctive from its value for primary batteries.

U.S. Pat. No. 4,577,145 teaches a charging system having means to distinguish between rechargeable and non-rechargeable batteries. The charger establishes an electromagnetic field proximate to the battery, wherein a circuit within a secondary battery, but not a primary battery, enters a resonant condition in response to the electromagnetic field, and the resonant condition is sensed by the charging system to switch the system from a non-charging mode to a charging mode.

U.S. Pat. Nos. 4,489,268, 4,602,202, 4,628,243, 4,645,996, 4,816,735, 5,038,093, 5,057,761, and 5,108,847 disclose chargers adapted for rechargeable batteries having a certain predetermined feature that must be present for the battery to be charged.

In U.S. Pat. No. 4,489,268, the predetermined feature is an annular charging terminal on the cylindrical portion of the battery. The charger has a cooperating contact that functions with rechargeable batteries having this annular charging terminal, thus precluding charging of primary batteries.

U.S. Pat. No. 4,602,202 discloses a predetermined feature that is a connector for attachment to the terminals of primary or secondary 9-Volt batteries, the connector having an actuating rod therein. Rechargeable 9-Volt batteries equipped with the connector may receive charging current from a charging circuit disposed in an appliance containing both the battery and the circuit. Cooperative action of the actuating rod and a compatible recess therefor disposed in the rechargeable battery permit the charging circuit to energize the battery. Primary batteries not having the recess cannot receive charging current from the charging circuit, as they do not contain the required recess for energizing the charging circuit.

The predetermined feature taught in the U.S. Pat. No. 4,628,243 is a conductive band that serves to bridge a pair of contacts when the battery is placed in the charger. When the contacts are electrically bridged, charging current is delivered to the battery terminals.

The predetermined feature taught in U.S. Pat. No. 4,645,996 is an elongated positive terminal that protrudes a greater distance above the top cover of the battery than is permitted by ANSI standards for primary or secondary batteries. A compatible battery charger has a contact for engaging only the elongated positive terminals of the batteries of the described invention. Because the battery having the elongated positive terminal substantially exceeds ANSI specifications for overall cell height, it cannot be used in most devices designed to accept cylindrical batteries cells of standard dimensions.

U.S. Pat. No. 4,816,735 discloses a battery charger having slotted keyway means for excluding therefrom batteries not having positive terminals of a minimum diameter of 0.240 inches. The excluding means is a slotted keyway sized to accept only C or D size batteries having positive terminal diameters of 0.240 inches (or less). Table 1, infra, however, shows that an Eveready C size primary alkaline battery would be accepted and charged by the battery charger of the '735 patent, even though that battery is neither intended, nor designed, to be recharged.

In U.S. Pat. Nos. 5,038,093 and 5,108,847, the predetermined feature is a first positive battery terminal forming an outer annulus for engaging a fast charging contact on a compatible battery charger. The first terminal is disposed at a radial distance from the longitudinal axis of the battery that is greater than that of conventional primary or secondary batteries. The compatible battery charger provides slow charging current to conventional primary or secondary batteries, or to the battery of the described invention through a second positive battery terminal forming an inner, indented recess. Only a battery having a first positive terminal forming an outer annulus will be fast charged by the compatible battery charger, however.

In U.S. Pat. No. 5,057,761, a battery charger is disclosed having means of distinguishing between batteries capable of being fast charged and batteries that should be slow charged. Fast charge batteries typically have positive terminals that are smaller in diameter than those of slow charge batteries, but that nonetheless fall within ANSI specifications for round cell positive cathode terminal width and height.

In the '761 patent, the positive terminal of a fast charge battery is inserted through a rectangular opening in the positive charger contact, the terminal protruding through the contact opening far enough to further engage and close a switching means for actuating a fast charge charging circuit. Slow charge batteries having larger diameter positive cathode terminals cannot be inserted through the opening, and therefore cannot engage the switching means. As a result, slow charge batteries are charged at a slower charge rate.

The '761 patent discloses a battery charger designed to accept and charge both slow charge nickel cadmium batteries and fast charge nickel cadmium batteries. Slow charge nickel cadmium batteries are typically manufactured in accordance with ANSI standards for round cell positive terminal height and diameter. Thus, the battery charger of the '761 patent will accept and charge conventional primary alkaline or zinc-carbon cylindrical batteries of the AAA, AA, C and D sizes at the slow charge rate because those batteries are also manufactured in accordance ANSI standards for positive terminal height and width.

The prior art shows that many ways have been found to construct a battery charger that will charge only batteries having a certain predetermined feature, none of which, however, is entirely satisfactory from the combined standpoints of safety, cost, manufacturability, and ease of use.

More particularly, none of the battery charging systems known heretofore is capable of discriminating on a low cost dimensional basis alone between batteries that should be charged, and primary and secondary batteries that should not be charged.

What is needed is a battery charger system that does not permit any undesired batteries to be charged therein. In the event that the consumer accidentally places a battery not having a predetermined feature into the charger, it is desirable that no charging current be delivered to such a battery.

What is also need is a battery charger system that may be manufactured and sold to consumers at low cost. Chargers having sensing or switching means for distinguishing between rechargeable and non-rechargeable batteries require more complicated electrical circuitry, resulting in increased charger cost. Chargers adapted for use with secondary batteries having separate charging terminals result in a more expensive battery. Although batteries are available in a variety of sizes, each having different current capabilities, it is too costly to require a different charger for each size battery, or to manufacture a charger adapted to charge batteries having different current capabilities at different rates, or for varied durations.

What is further needed is a battery charger system that is easy to use. It is desirable to produce a battery charger system that is simple to use and consumer-friendly. The charger should be designed so that the consumer may place the battery into the charger with ease.

It is therefore an object of the present invention to provide a charger that is capable of recharging the batteries only if the batteries have a predetermined feature.

It is another object of the present invention to provide a charger that can accommodate the several different sizes, and charge the battery without regard to the different current capabilities.

It is yet another object of the present invention to provide a charger that is simple to use and consumer-friendly.

It is still yet another object of the present invention to provide a charger that does not provide a charging current to primary or secondary batteries not having the predetermined feature, but which are accidentally placed in the charger.

It is a further object of the present invention to provide a charger that can accommodate a variety of battery sizes.

It is further object yet of the present invention to provide a charger that is simple and inexpensive to manufacture.

Other objects and advantages will become apparent from the detailed description of the invention.

SUMMARY OF THE INVENTION

In accordance with the battery, battery charger, and battery charging system of the present invention, there is provided a battery that is manufactured with minor changes to available manufacturing lines, and a battery charger that simply and inexpensively ensures safe operation by making electrical contact only with compatible batteries having a predetermined feature indicative of the electrical characteristics.

Cylindrical batteries, whether or not they have the predetermined feature, can be placed into the battery charger of the present invention. However, cylindrical batteries not having the predetermined feature cannot be charged by the battery charger. The battery charger of the present invention has a housing containing a plurality of battery support means and a sidewall. Within the sidewall are a plurality of recesses, into which only the predetermined feature of the batteries to be charged may fit. The contacts for charging the batteries are behind the recesses, thereby insuring that electrical contact is achieved only with batteries having the particular predetermined feature.

Some objects of the present invention are attained in a battery charging system for charging batteries of a first size having a predetermined feature, the battery charger preventing batteries not having the predetermined feature from being charged, comprising at least one first battery of the first size having the predetermined feature, the predetermined feature being a cathode terminal having a height G of at least 0.125 inches and substantially equal upper and lower diameters, the diameters being less than those of batteries of the first size not having the predetermined feature. The battery charging system further includes a battery charger comprising a housing having at least one compartment for receiving batteries, the compartment having at least one wall and a floor, the floor having a support element thereon for supporting at least one battery, the wall having at least one first circular recess disposed therein, the at least one first battery of the first size aligning matingly in respect of and slideably engaging the first circular recess corresponding thereto when positioned on the support element, the first recess having a first diameter slightly larger than the diameter of the cathode terminal of the at least one first battery of the first size, the battery charger further comprising circuit means for supplying a charging current to the at least one first battery of the first size having the predetermined feature, and positive and negative charger contacts for connecting the at least one first battery of the first size having the predetermined feature to the circuit means.

Further objects of the present invention are attained in the at least one battery of the first size having the predetermined feature, wherein the first size battery is a C-size battery or a D-size battery.

Still other objects of the present invention are attained in a battery charging system wherein the predetermined feature of the least one battery further includes an F/N to G ratio of no more than 1.250 and no less than 0.700, an F/N to G ratio of no more than 1.620 and no less than 0.700, and a height G exceeding 0.170 inches.

Still further objects yet of the present invention are attained in a battery charging system wherein the wall further has at least one second circular recess disposed therein, the second circular recess having a second diameter different from the first diameter, the second recess having a second diameter slightly larger than the diameter of the cathode terminal of an at least one second battery of a second size, the at least one second battery of the second size aligning matingly in respect of and slideably engaging the second circular recess corresponding thereto when positioned on the support element, the second size being different from the first size, the battery charger having circuit means for supplying a charging current to the at least one second battery of the second size having the predetermined feature, and positive and negative charger contacts for connecting the at least one second battery of the second size having the predetermined feature to the circuit means.

Yet other objects of the present invention are attained in a battery charging system, wherein the predetermined feature is indicative of the electrical characteristics of the battery, or the housing further has a plurality of compartments for receiving batteries disposed therein.

Other features of the present invention become apparent with reference to the drawings and the description of the preferred embodiments.

BRIEF DESCRIPTION OF THE DRAWINGS

The foregoing and other objects, features, and advantages of the present invention will become better understood by referring to the following description, appended claims, and accompanying drawings, where:

DESCRIPTION OF THE PREFERRED EMBODIMENTS

While those skilled in the art will recognize that the present invention is applicable to all types of cylindrical C- and D-size rechargeable batteries, discriminating battery chargers therefor, and methods of making and using same, the particular embodiments of the invention set forth herein relate to rechargeable alkaline batteries.

Figure 1:
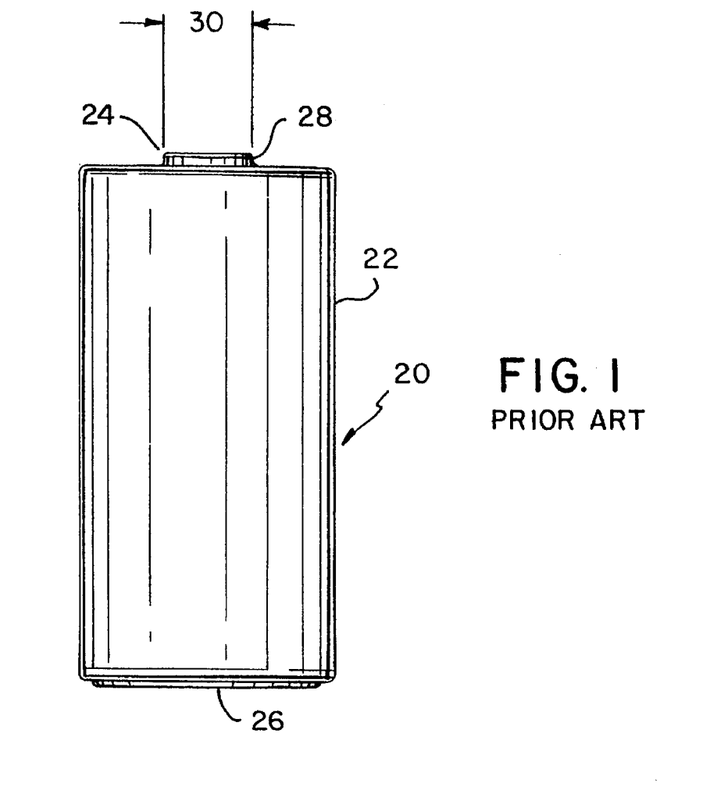
FIG. 1 is a side view of a prior art battery.

Referring more particularly to FIGS. 1 to 8, wherein like numbers refer to similar parts, a conventional battery 20 having dimensions conforming to American National Standards Institute (hereinafter referred to as "ANSI") specifications for dry cell batteries, and typical of those in the prior art, is shown in FIG. 1. Prior art battery 20 has cylindrical case 22 with positive terminal 24, otherwise referred to herein as cathode end cap 24, at the upper end thereof, and negative terminal 26 at the lower end thereof. Positive terminal 24 has cathode terminal 28 protruding therefrom. Cathode terminal 28 is adapted to engage against the negative terminal of an adjacent battery, the positive contact of an energy using device, or the positive contact of a battery charger.

Dry cell batteries are available for consumer use in a number of standard sizes having dimensions specified by the ANSI. Those dry cell sizes are designated by the letters D, C, AA, and AAA. ANSI specifications for C and D-size primary battery dimensions are set forth in ANSI C18.1M-1992, "American National Standards for Dry Cells and Batteries—Specifications," which publication is hereby incorporated by reference in its entirety. C-size battery dimensions are set forth in C18.1M-1992 at 20-1031-1969. D-size battery dimensions are set forth in C18.1M-1992 at 20-1346-2421. U.S patent application Ser. No. 07/968,337, filed Oct. 29, 1992, now U.S. Pat. No. 5,443,924 and entitled "Discriminating Charger and Compatible Battery," is hereby incorporated by reference.

FIG. 1 shows cathode terminal 28 as having cathode diameter 30, otherwise commonly referred to as diameter D, or ANSI dimension F/N (see ANSI C18.1M-1992). To meet ANSI specifications for dry cell dimensions, diameter 30 must range between 0.217 inches and 0.295 inches for a C-size battery (see ANSI C18.1M-1992 at 20-1031-1969), or between 0.307 inches and 0.374 inches for a D-size battery (see ANSI C18.1M-1992 at 20-1346-2421).

Figure 2:
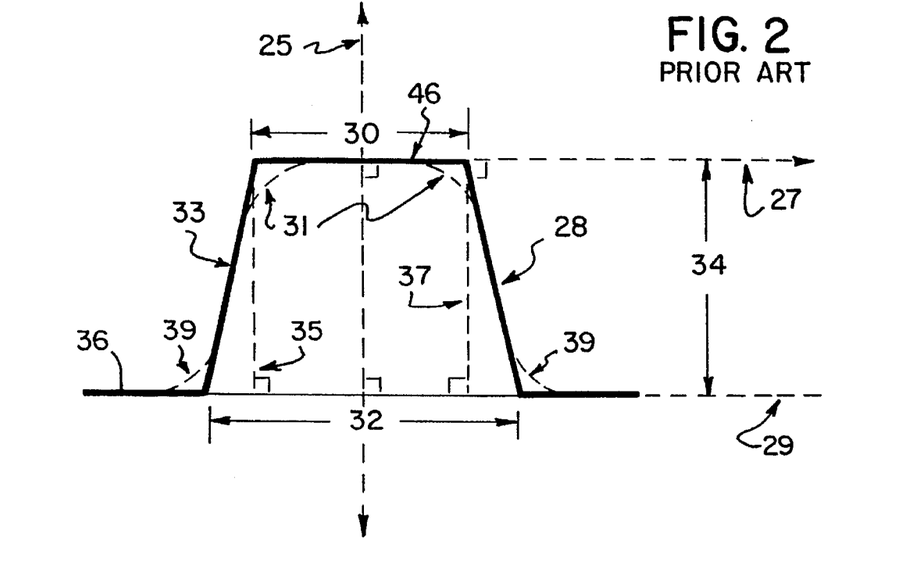
FIG. 2 is an enlarged side view of a stylized cathode terminal.

FIG. 2 shows an enlarged side view of stylized cathode terminal 28 having upper cathode terminal diameter 30, lower cathode terminal diameter 32, cathode terminal height 34 (also referred to herein as "G" in conformance with ANSI C18.1M-1992), annular base 36, and upper terminal surface 46. Longitudinal axis 25 bisects cathode terminal 28 vertically, and is oriented perpendicular to horizontal axes 27 and 29. Horizontal axis 29 is coincident with and parallel to annular base 36, while horizontal axis 27 is coincident with and parallel to cathode terminal upper surface 46. It is important to note that cathode terminal height G is measured vertically herein between horizontal axes 27 and 29. It is equally important to note that upper cathode terminal diameter 30 and lower cathode terminal diameter 32 are measured horizontally herein between vertical axes 35 and 37, even if cathode terminal 28 has radius 31 between cathode terminal sidewall 33 and cathode terminal upper surface 46, or even if cathode terminal 28 has radius 39 between cathode terminal sidewall 33 and annular base 36. To conform with ANSI specifications for C- and D-size dry cell dimensions, cathode terminal height G must be greater than or equal to 0.059 inches (see ANSI C18.1M-1992 at 20-1031-1969, and at 20-1346-2421).

The foregoing ANSI specifications set forth a wide range of acceptable cathode terminal diameters. Those specifications do not, however, specify where cathode terminal diameter 30 should be measured along cathode terminal height 34. It was determined that different battery models produced by various battery manufacturers were characterized by widely varying cathode terminal diameters F/N and heights G. It was also determined that cathode terminal diameter F/N often varied along cathode terminal height 34.

One means of charging only batteries having a predetermined feature, where the predetermined feature is a cathode terminal of diameter D or less, is to provide a battery charger having a positive contact recess of diameter D. Referring to FIG. 2, it becomes clear that even if a battery's lower cathode terminal diameter 32 exceeds D, such a battery charger might still receive and charge a battery it should not charge if the battery's upper cathode terminal diameter 30 is less than D. Contrariwise, the same battery charger might not receive and charge a battery it should charge if the battery has an upper cathode terminal diameter 30 greater than D, but a lower cathode terminal diameter 32 less than D. Thus, upper cathode terminal diameter 30 (or F/N) determines primarily whether or not a battery will be received and charged by a battery charger that discriminates between batteries on the basis of cathode terminal diameter.

As discussed, dimensions F/N and G vary from battery model to battery model, and from manufacturer to manufacturer. Table 1 lists the smallest diameter F/N and largest terminal height G of various C-size battery cathode terminals measured using optical or mechanical means. The dimensions set forth in Table 1 resulted from measurements performed on two to five batteries of each C-size battery model produced by the manufacturers indicated therein. Table 1 shows the variation in dimensions F/N and G occurring in C-size prior art batteries.

TABLE 1

Prior Art Cathode Terminal Dimensions of C-Size Batteries

| Battery Size | Battery Type | Manufacturer | Model Number | F/N (minimum measured) | G (maximum measured) | (F/N)/G |
|---|---|---|---|---|---|---|
| C | Primary Alkaline | Rayovac | 814 | 0.2585" | 0.1480" | 1.747 |
| C | Primary Alkaline | Duracell | MN1400 | 0.2490" | 0.1410" | 1.723 |
| C | Primary Alkaline | Eveready | E93 | 0.2313" | 0.0970" | 2.385 |
| C | Primary Alkaline | Kodak | KC | 0.2355" | 0.1655" | 1.423 |
| C | Primary Alkaline | Panasonic | LR-14(PG) | 0.2480" | 0.0980" | 2.531 |
| C | Rechargeable Nickel-Cad. | Rayovac | 614 | 0.2485" | 0.1540" | 1.614 |
| C | Rechargeable Nickel-Cad. | Sanyo | N-1800C | 0.2760" | 0.1330" | 2.075 |

Table 1 shows that the smallest diameter F/N measured among prior art C-size batteries was 0.2313 inches (Eveready E93 primary alkaline battery), and that the largest cathode terminal height G measured among prior art batteries was 0.1655" (Kodak KC primary alkaline battery). Both measurements fall within the ANSI range of permitted cathode terminal diameters and heights for C-size batteries. Table 1 also shows that the smallest ratio of F/N to G in C-size prior art batteries is 1.423 (Kodak KC primary alkaline battery).

Table 2 lists the largest diameter F/N and smallest cathode terminal height G falling within the manufacturing specifications of C-size Rayovac "RENEWAL"™ rechargeable alkaline manganese batteries, wherein the cathode terminals of such batteries are constructed in accordance with the present invention.

TABLE 2

Cathode Terminal Dimensions of Rayovac C-Size Batteries of the Present Invention

| Battery Size | Battery Type | Manufacturer | Model Number | F/N (minimum measured) | G (maximum measured) | (F/N)/G |
|---|---|---|---|---|---|---|
| C | Rechargeable Alkaline | Rayovac | 714 | 0.212" | 0.172" | 1.146 |

Rayovac's manufacturing specifications for the C-size Model 714 rechargeable alkaline battery call for a cathode terminal having a diameter F/N of 0.210 inches, plus or minus 0.002 inches, and a height G of 0.175 inches, plus or minus 0.003 inches. The minimum cathode terminal diameter permitted under ANSI specifications for dry cell dimensions in C-size batteries is 0.217 inches. The maximum diameter F/N of the 714 battery cathode terminal is therefore 0.005 inches less than that permitted under ANSI specifications, and 0.019 inches less than the smallest diameter F/N measured in Table 1 (Eveready Model No. E93 primary alkaline battery).

The largest ratio F/N to G possible for a cathode terminal of a C-size "RENEWAL" battery made in accordance with the foregoing C-size battery manufacturing specifications is 1.146. The smallest ratio F/N to G measured in prior art batteries was 1.423 (Kodak KC primary alkaline battery). Thus, the smallest ratio F/N to G of C-size prior art batteries is 25% greater than the maximum ratio F/N to G permitted under manufacturing specifications for C-size "RENEWAL" batteries of the present invention.

Figure 3:
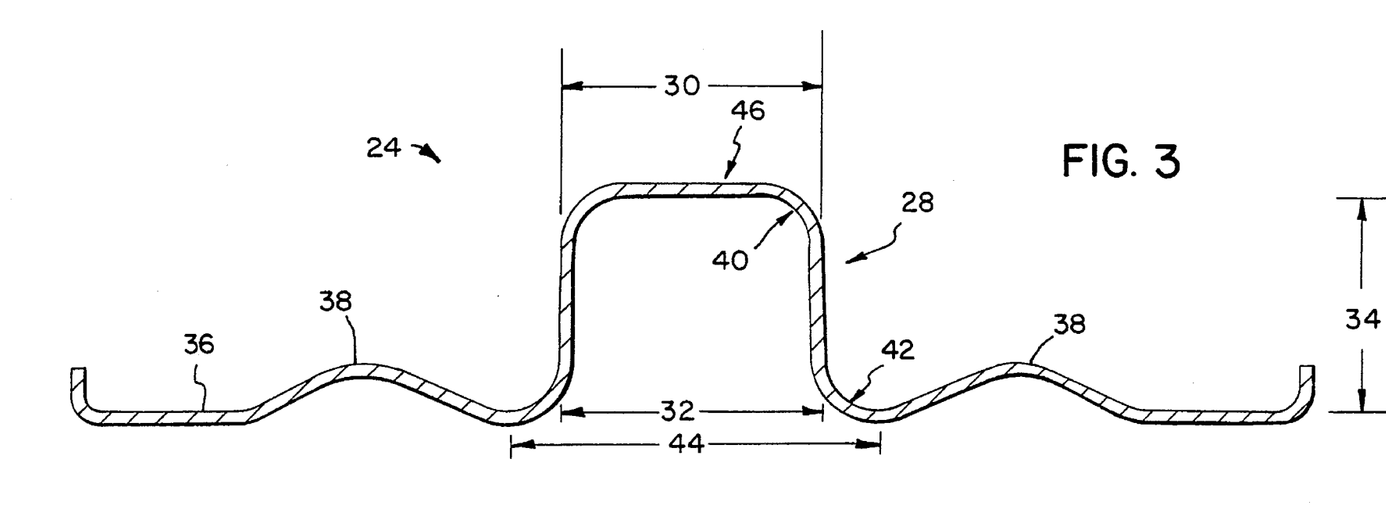
FIG. 3 is a cross-sectional view of a cathode end cap for a C-size battery of the present invention.

FIG. 3 shows a cross-sectional view of a cathode end cap, or positive terminal 24, of a C-size battery of the present invention. Upper cathode terminal diameter 30 is substantially equal to lower cathode terminal diameter 32, and most preferably ranges between 0.208 and 0.212 inches. Thus, the present invention is characterized in having substantially no variation in cathode terminal diameter along cathode terminal height 34. Optionally, cathode end cap ridge 38 may be disposed between the outer periphery of positive terminal 24 and cathode terminal 28. Cathode terminal 28 has upper radius 40, which should not exceed about 0.040 inches. Most preferably, base diameter 44 is about 0.290 inches, while outer radius 42 is about 0.040 inches, plus or minus 0.005 inches. Cathode terminal height 34, or G, most preferably ranges between 0.172 and 0.178 inches, but may be as low as 0.170 inches.

For reasons discussed in more detail infra, cathode terminal 28 of the present invention is characterized by at least three of maximum diameter F/N, maximum ratio F/N to G, minimum height G, and substantially equal upper and lower diameters 30 and 32 (or F/N and 32). It was discovered that the ratio F/N to G in a C-size battery of the present invention should most preferably not exceed 1.250, but in no event should be less than 0.700. It was also determined that height G in C-size batteries should exceed 0.125 inches, and most preferably should exceed 0.170 inches, to minimize the possibility of undesired batteries being charged by the battery charger of the present invention.

Table 3 lists the smallest diameter F/N and largest terminal height G of various D-size battery cathode terminals measured using optical or mechanical means. The dimensions set forth in Table 3 resulted from measurements performed on two to five batteries of each C-size battery model produced by the manufacturers indicated therein. Table 3 shows the variation in dimensions F/N and G occurring in D-size prior art batteries.

TABLE 3

Prior Art Cathode Terminal Dimensions of D-Size Batteries

| Battery Size | Battery Type | Manufacturer | Model Number | F/N (minimum measured) | G (maximum measured) | (F/N)/G |
|---|---|---|---|---|---|---|
| D | Primary Alkaline | Rayovac | 813 | 0.3400" | 0.1655" | 2.054 |
| D | Primary Alkaline | Duracell | MN1300 | 0.3205" | 0.1325" | 2.419 |
| D | Primary Alkaline | Eveready | E95 | 0.3277" | 0.0970" | 3.378 |
| D | Primary Alkaline | Kodak | KD | 0.3375" | 0.2070" | 1.630 |
| D | Primary Alkaline | Panasonic | LR-20(PG) | 0.3515" | 0.1150" | 3.056 |
| D | Rechargeable Nickel-Cad. | Rayovac | 613 | 0.3395" | 0.1410" | 2.408 |
| D | Rechargeable Nickel-Cad. | Gates | BD | 0.3410" | 0.1340" | 2.545 |
| D | Rechargeable Nickel-Cad. | Sanyo | N-4000D | 0.3130" | 0.1260" | 2.484 |

Table 3 shows that the smallest diameter F/N measured among D-size batteries was 0.3130 inches (Sanyo rechargeable nickel-cadmium N-4000D battery), and that the largest cathode terminal height G measured was 0.2070 inches (Kodak KD primary alkaline battery). Both measurements fall within the ANSI range of permitted cathode terminal diameters and heights for D-size batteries. Table 3 also shows that the smallest ratio of F/N to G in D-size prior art batteries is 1.630 (Kodak KC primary alkaline battery).

Table 4 lists the largest diameter F/N and smallest cathode terminal height G falling within the manufacturing specifications of D-size Rayovac "RENEWAL"™ rechargeable alkaline manganese batteries, wherein the cathode terminals of such batteries are constructed in accordance with the present invention.

TABLE 4

Cathode Terminal Dimensions of Rayovac D-Size Batteries of the Present Invention

| Battery Size | Battery Type | Manufacturer | Model Number | F/N (minimum measured) | G (maximum measured) | (F/N)/G |
|---|---|---|---|---|---|---|
| D | Rechargeable Alkaline | Rayovac | 713 | 0.295 | 0.189" | 1.612 |

Rayovac's manufacturing specifications for the D-size Model 713 rechargeable alkaline battery call for a cathode terminal having a diameter F/N of 0.290 inches, plus or minus 0.005 inches, and a height G of 0.192 inches, plus or minus 0.003 inches. The minimum cathode terminal diameter permitted under ANSI specifications for dry cell dimensions in D-size batteries is 0.307 inches. The maximum diameter F/N of the 713 battery cathode terminal is therefore 0.012 inches less than that permitted under ANSI specifications, and 0.018 inches less than the smallest diameter F/N measured in Table 1 (Sanyo Model No. N-4000D secondary nickel-cadmium battery).

The largest ratio F/N to G possible for a cathode terminal of a D-size "RENEWAL" battery made in accordance with the foregoing D-size battery manufacturing specifications is 1.612. The smallest ratio F/N to G measured in prior art batteries was 1.630 (Kodak KD primary alkaline battery). Thus, the smallest ratio F/N to G of D-size prior art batteries is 11% greater than the maximum ratio F/N to G permitted under manufacturing specifications for D-size "RENEWAL" batteries of the present invention.

Figure 4:
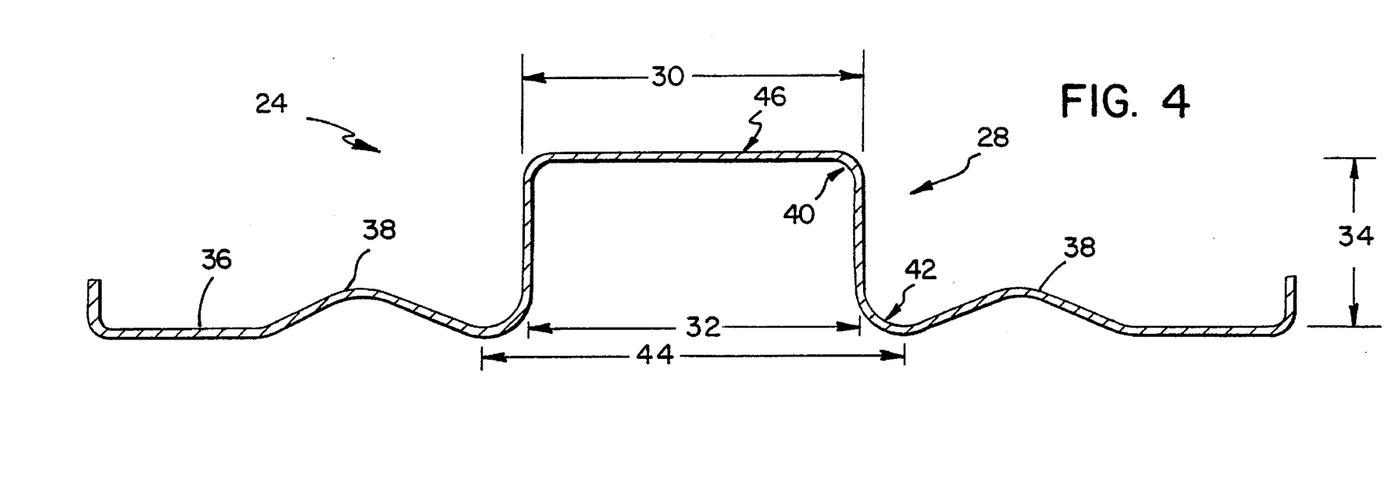
FIG. 4 is a cross-sectional view of a cathode end cap for a D-size battery of the present invention.

FIG. 4 is a cross-sectional view of a cathode end cap, or positive terminal 24, of a D-size battery of the present invention. Upper cathode terminal diameter 30 is substantially equal to lower cathode terminal diameter 32, and should range between 0.285 and 0.295 inches. Thus, the present invention is characterized in having substantially no variation in cathode terminal diameter along cathode terminal height 34. Optionally, cathode end cap ridge 38 may be disposed between the outer periphery of positive terminal 24 and cathode terminal 28. Cathode terminal 28 has upper radius 40, which should not exceed 0.050 inches. Most preferably, base diameter 44 is about 0.380 inches, while outer radius 42 is about 0.040 inches, plus or minus 0.005 inches. Cathode terminal height 34, or G, most preferably ranges between 0.189 and 0.195 inches, but may be as low as 0.170 inches.

For reasons discussed in more detail infra, cathode terminal 28 of the present invention in D-size batteries is characterized by at least three of maximum diameter F/N, maximum ratio F/N to G, minimum height G, and substantially equal upper and lower diameters 30 and 32 (or F/N and 32). It was discovered that the ratio F/N to G in a D-size battery of the present invention should most preferably not exceed 1.620, and in no event should be less than 0.700. It was also determined that height G in D-size batteries should exceed 0.125 inches, or most preferably should exceed 0.170 inches, to minimize the possibility of undesired batteries being charged by the battery charger of the present invention.

In accordance with the present invention, therefore, rechargeable alkaline C- and D-size batteries are designed and constructed in a first preferred embodiment to have cathode terminal diameters F/N, and ratios F/N to G, that are appreciably less than those disclosed in the prior art, or permitted under ANSI standards. They are also constructed in the first embodiment to have cathode terminal heights G which are generally greater than those known in the prior art. In a second preferred embodiment, rechargeable alkaline C- and D-size batteries are designed and constructed to have cathode terminal diameters F/N less than those permitted under ANSI standards, cathode terminal heights G exceeding 0.125 inches, and substantially equal upper and lower cathode terminal diameters 30 and 32. Such small cathode terminal diameters, small F/N to G ratios, large cathode terminal heights G, and substantially equal upper and lower cathode terminal diameters present special problems in manufacturing, however, that proved difficult to overcome.

It was discovered that small diameter, small F/N to G ratio, large height G cathode terminals having substantially equal upper and lower diameters 30 and 32, and having mechanical integrity sufficient to withstand the stresses of normal battery use and operation, were impossible to draw without modifying substantially a process for drawing cathode end caps known in the art heretofore. In particular, it was discovered that the structural integrity of a battery cathode terminal (and its consequent ability to withstand the stresses of normal battery use and operation) depended on a minimum ratio F/N to G of 0.700. Substantial difficulties were introduced by the requirement that the upper and lower cathode terminal diameters be substantially equal.

As discussed, in the first preferred embodiment of the invention the ratio F/N to G should most preferably not exceed 1.250 and 1.620 in C- and D-size batteries, respectively, so that the battery charger of the battery charging system of the present invention will charge only batteries having the predetermined feature of the present invention. Physical limits imposed by the process for stamping cathode terminals of the present invention, and by the materials used therein, do not permit the ratio F/N to G to be less than 0.700 in both C- and D-size batteries. Cathode terminals having F/N to G ratios less than 0.700 are friable, fracture easily, and do not have sufficient mechanical integrity to withstand the stresses to which batteries are subjected during the course of normal use and operation.

Thus, in the first preferred embodiment of the invention a range of suitable F/N to G ratios has been discovered, which in combination with a minimum cathode terminal height G of 0.125 inches and upper and lower cathode terminal diameters that are substantially equal, permits only batteries having the predetermined feature of the present invention to be charged in the battery charger of the present invention. The range of suitable F/N to G ratios also permits cathode terminals of sufficient mechanical integrity and strength to be manufactured, despite their small diameter.

The preferred drawing method of making cathode terminals of the present invention will now be described. A strip of three-and-a-half inch wide, 0.010 inch thick, deep drawing grade, low carbon, cold rolled, No. 5 temper nickel plated steel is fed into a Bruderer 60-ton high speed punching press containing a Danly progressive die set. The die set comprises an upper heavy duty plate and a lower heavy duty plate connected by four guide pins positioned in ball bearing cages. The upper and lower plates are aligned precisely by the guide pins.

In each of the two plates, ten three-station high grade steel tools are mounted in-line at horizontal distances of 1.25 inches from one another, each tool having carbide disposed on the high wear surfaces thereof. As the steel strip progresses from station to station, cathode end caps, and positive cathode terminals integral thereto, assume more definite shape. The punching press may be operated at a rate between 250 and 400 strikes per minute, but most preferably operates at a rate of 300 strikes per minute.

Drawing cathode end caps having substantially equal upper and lower cathode terminal diameters proved difficult. It was discovered that at least one extra tool die station was required to be added to the tool die press to manufacture such cathode end caps in respect of known manufacturing processes. It was also discovered that an F/N to G ratio of 0.700 was the lower limit for drawing cathode end caps having substantially equal cathode terminal upper and lower diameters.

In conventional methods of drawing cathode end caps, a steel strip is often dipped in lubricating oil prior to entering the punching press. In the present invention, contrariwise, it was discovered that lubricant must be sprayed continuously onto the top and bottom surfaces of the steel strip while it is being drawn in the punching press and die to prevent fracturing or overheating thereof. Lubricant is most preferably sprayed in a fine mist by hydraulic means from a first nozzle positioned above the steel strip, and a second nozzle positioned below the steel strip, each nozzle spraying lubricant over a 110 degree swath. Lubricant is sprayed onto the steel strip along substantially its entire length in the press and die each time the upper and lower die plates pull apart, and before a new strike is initiated. The preferred lubricant for this purpose is Syndraw No. 18R-2 water-soluble lubricating oil available from Franklin Oil Corporation of Bedford, Ohio. In its most preferred embodiment such lubricating oil is mixed in a 1:1 ratio with water.

In its preferred embodiment, the battery of the present invention is a rechargeable alkaline battery, such as those disclosed in U.S. Pat. No. 5,108,852, entitled "Manganese Dioxide Cathode for a Rechargeable Alkaline Cell, and Cell Containing Same," U.S. Pat. No. 5,324,332 entitled "Alkaline Manganese Dioxide Cells," and U.S. patent application Ser. No. 08/257,569 filed Jun. 10, 1994, entitled "Battery Having Meltable Sealant Barrier," the disclosures of which are hereby incorporated by reference herein.

The '852 patent discloses a battery having unconstrained cathodes. That is, no cage is used to constrain the cathode. The cathode is restricted from significantly changing its dimensions during discharge of the cell, when it is inclined to swell, as opposed to the tendency of the cathode to contract during the charge cycle. The cathode substantially fills the entire space allotted for it within the cell, with a slight accommodation for height-wise or longitudinal expansion or growth of the cathode of bobbin-type cells or cross-wise expansion or growth of button-type cells. There may be additives in the cathode mix, including particularly conductive fibers of graphite or other conductive materials. Other materials may also be added to the cathode mix, including metallic additives. A preferred rechargeable alkaline cell would consist of a cathode composed mostly of manganese dioxide and an anode consisting usually of 50–70% zinc powder.

The '332 patent discloses a method of metering hot melt sealant into the bottom of a rechargeable alkaline cell.

The '569 patent application discloses a hot melt sealant and separator structure for a rechargeable alkaline cell.

Figure 5:
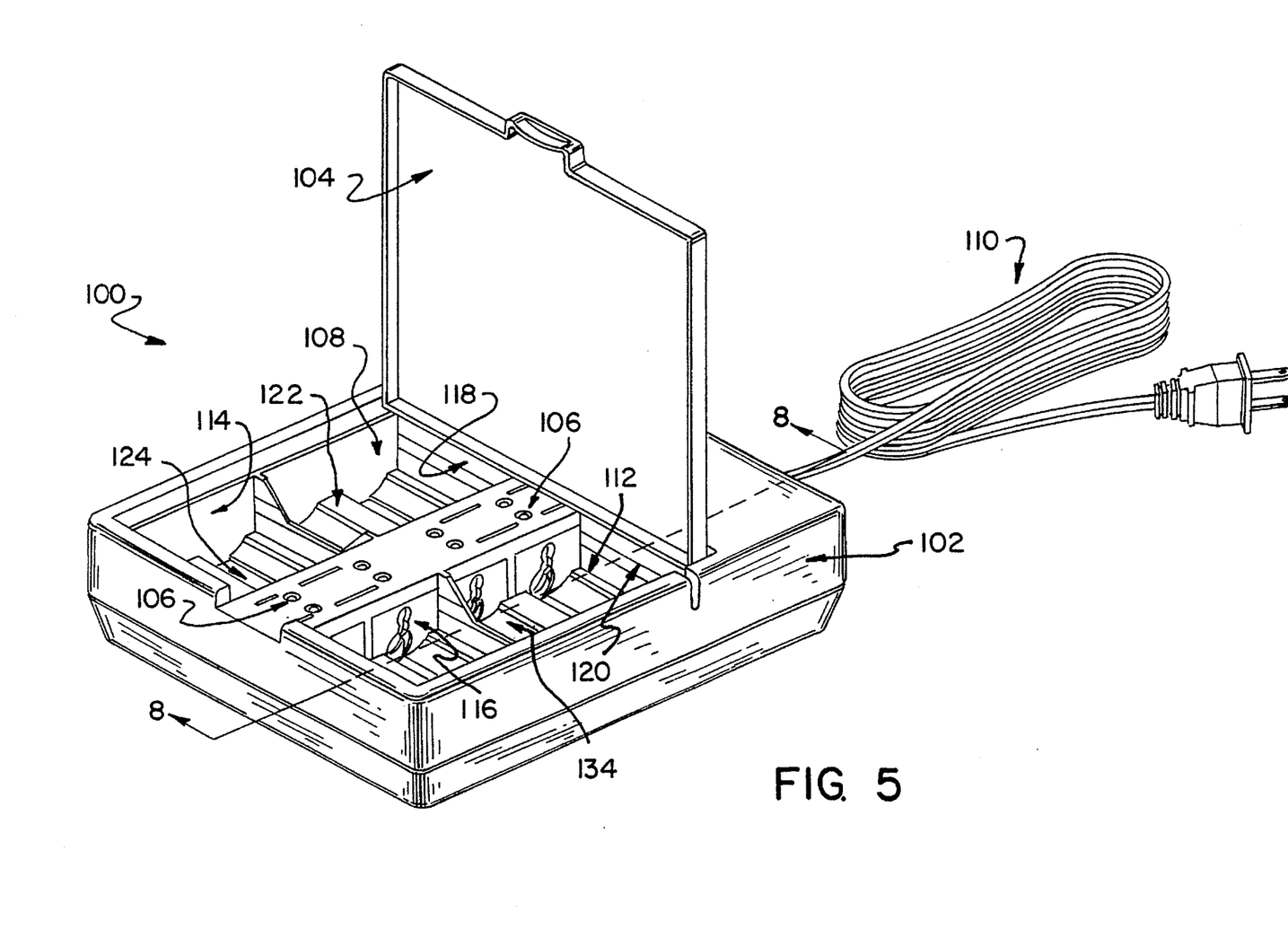
FIG. 5 is a perspective view of the battery charger of the present invention.

The battery of the present invention is adapted to be utilized in a specialized battery charger 100, shown in FIG. 5. The charger 100 will make electrical contact only with the battery of the present invention and avoids the hazards of recharging a primary or unsuitable secondary battery therein.

The structure of the battery of the present invention is particularly advantageously employed in the battery charger of the present invention. As primary batteries are not intended to be recharged, there is a danger that an uninformed consumer may attempt to recharge a prior art battery in a charger adapted to charge rechargeable alkaline batteries. The charger and battery of the present invention work together to prevent electrical current from being supplied to a primary alkaline battery, or to any otherwise unsuitable secondary battery, where either battery does not have a predetermined feature enabling it to be charged in the battery charger of the present invention.

Referring to FIG. 5 there is shown a battery charger 100 constructed in accordance with the present invention. Battery charger 100 comprises a housing 102 which can be constructed from, for example, molded plastic. Housing 102 has disposed therein the electrical elements of the charger. Housing 102 is fitted with hinged lid 104 by means of suitable projections formed on the lid that fit within holes formed on housing 102. Hinged lid 104 prevents dust from accumulating within compartments 108 and 112. Light emitting diodes 106 are adapted to indicate when the charger 100 is supplying current to a particular battery. Household current powers charger 100 through power cord 110.

Figure 6:
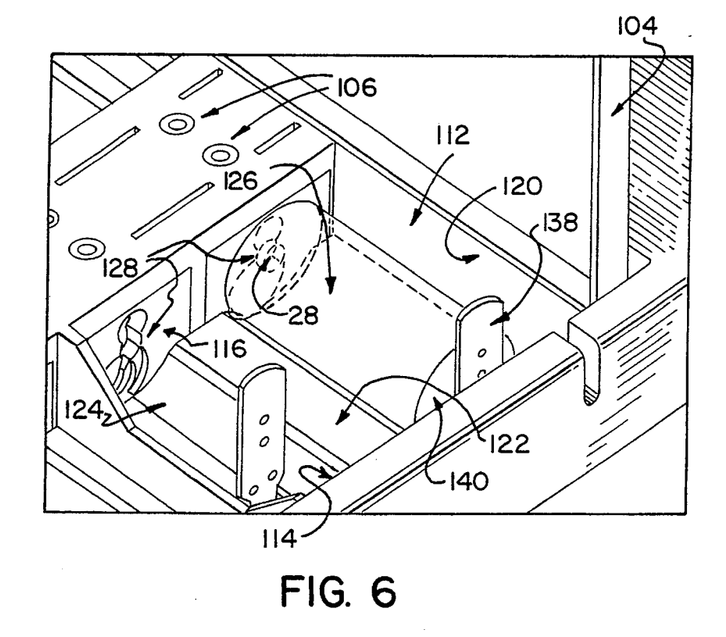
FIG. 6 is an expanded perspective view of the compartment of the battery charger of the present invention having a C-size cell of the present invention disposed therein.

Referring now to FIGS. 5 and 6, each of compartments 108 and 112 is defined by a front wall 114, a rear wall 116, end walls 118 and 120, and a floor 122. As shown in FIGS. 6, 7, 8 and 9, four elongated support elements 124 are integral to floor 122 in each of compartments 108 and 112, each such support element extending between front wall 114 and rear wall 116. Support elements 124 are arranged to form support means for AAA, AA, C, and D-size batteries in charger 100, which in the embodiment shown will accept up to eight batteries at any one time.

FIG. 6 shows a battery 126 of a first size of the present invention positioned in support element 124. In FIG. 6 the first size battery shown is of the standard C-size. FIG. 8 shows an enlarged cross-sectional view of the battery compartment of FIGS. 6 and 7, wherein the structures forming elongated support element 124 are shown in more detail. Referring now to both FIGS. 6 and 8, cathode terminal 28 of C-size battery 126 can be seen to be adapted to be received by first circular recess 128 disposed in rear wall 116. First circular recess 128 most preferably has a diameter 130 less than 0.217 inches. First circular recess 128 may have a diameter 130 as large as 0.230 inches; provided, however, that the battery adapted to be accepted and charged by the battery charger of the present invention has a cathode terminal having substantially equal upper and lower diameters, and a cathode terminal height G sufficient to engage metal positive charger contact 132 disposed behind rear wall 116.

FIG. 8 shows that elongated support element 124 has longitudinal surface 134 and longitudinal edge 136 adapted to support C-size battery 126 at a vertical height and lateral position such that the center of cathode terminal 28 of battery 126 is aligned with the center of first circular recess 128, and such that cathode terminal 28 of battery 126 and first circular recess 128 matingly engage as spring-biased negative charger contact 138 urges battery 126 towards rear wall 116.

First circular recess 128 accepts the large height G, small diameter F/N, substantially equal upper and lower diameter cathode terminals of C-size batteries of the present invention, but excludes the cathode terminals of all other C- and D-size primary or secondary batteries. Positive charger contact 132 and negative charger contact 138 are connected to electrical circuit means for providing charging current to battery 126. When cathode terminal 28 of battery 126 engages positive charger contact 132, and anode terminal 140 of battery 126 engages negative charger contact 138, charger 100 can provide charging current to battery 126.

Figure 7:
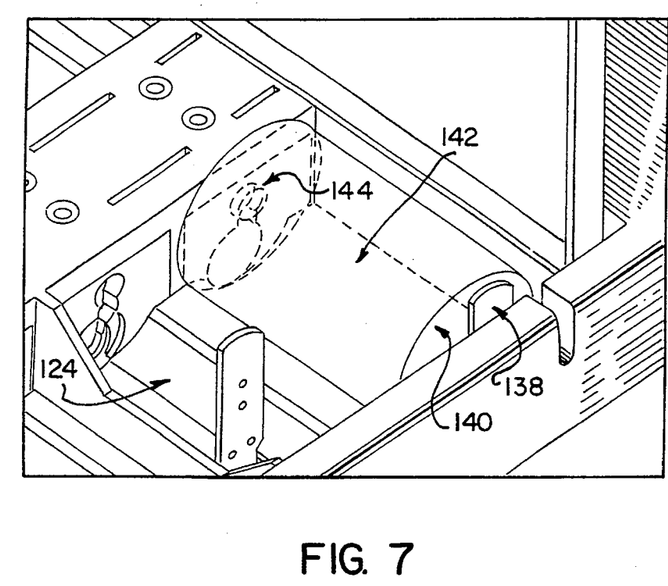
FIG. 7 is an expanded perspective view of the compartment of the battery charger of the present invention having a D-size cell of the present invention disposed therein.
Figure 8:
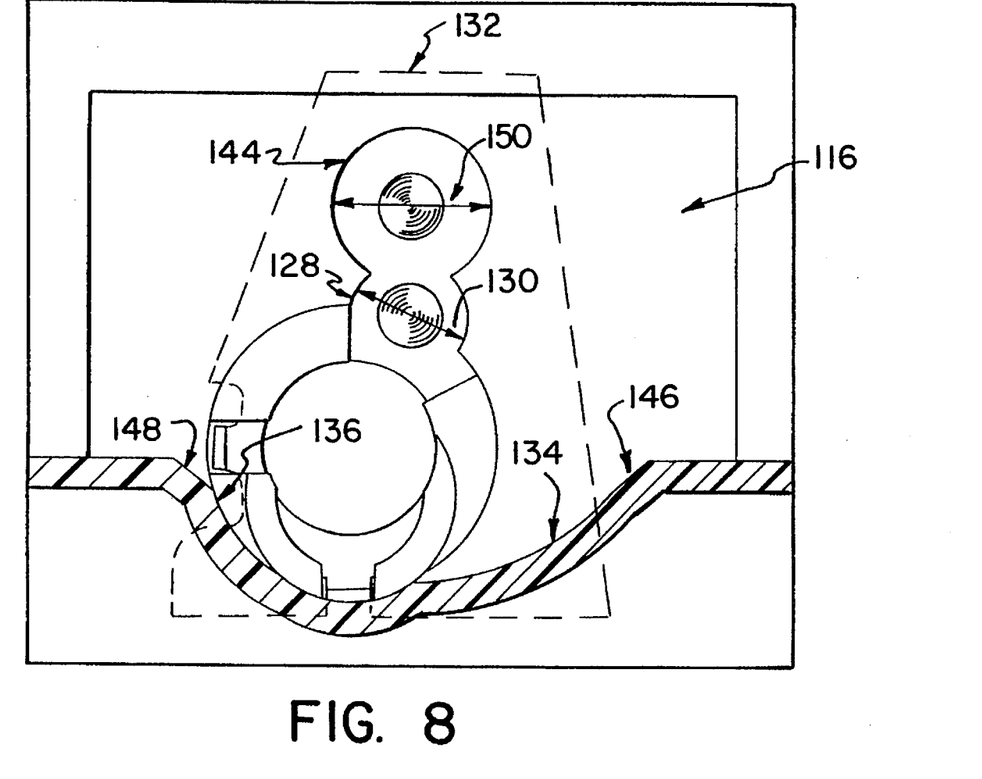
FIG. 8 is an expanded cross-sectional view of the battery compartment of the present invention.

FIG. 7 shows a battery 142 of a second size of the present invention positioned in support element 124. In FIG. 7 the second size battery shown is of the standard D-size. FIG. 8 shows an enlarged cross-sectional view of the battery compartment of FIG. 7, wherein the structures forming elongated support element 124 are shown in more detail. Referring now to both FIGS. 7 and 8, cathode terminal 28 of D-size battery 142 can be seen to be adapted to be received by second circular recess 144 disposed in rear wall 116. Second circular recess 144 most preferably has a diameter 150 less than 0.307 inches. Second circular recess 144 may have a diameter 150 as large as 0.327 inches; provided, however, that the battery adapted to be accepted and charged by the battery charger of the present invention has a cathode terminal having substantially equal upper and lower diameters, and a cathode terminal height G sufficient to engage metal positive charger contact 132 disposed behind rear wall 116.

FIG. 8 shows that elongated support element 124 has longitudinal surfaces 146 and 148 adapted to support D-size battery 142 at a vertical height and lateral position such that the center of cathode terminal 28 of battery 142 is aligned with the center of second circular recess 144, and such that cathode terminal 28 of battery 142 and second circular recess 144 matingly engage as spring-biased negative charger contact 138 urges battery 144 towards rear wall 116.

Second circular recess 144 accepts the large height G, small diameter F/N, substantially equal upper and lower diameter cathode terminals of D-size batteries of the present invention, but excludes the cathode terminals of all other C- and D-size primary or secondary batteries. Positive charger contact 132 and negative charger contact 138 are connected to electrical circuit means for providing charging current to battery 142. When cathode terminal 28 of battery 142 engages positive charger contact 132, and anode terminal 140 of battery 142 engages negative charger contact 138, charger 100 can provide charging current to battery 142.

While the invention has been described with reference to specific embodiments, it will be apparent to those skilled in the art that many modifications and variations may be made. Accordingly, the present invention is intended to embrace all such alternatives, modifications and variations that may fall within the spirit and scope of the appended claims and equivalents thereof.

We claim:

1. A battery charging system for charging batteries of a first size having a predetermined feature, the battery charger preventing batteries not having the predetermined feature from being charged, comprising:

(a) at least one first battery of the first size having the predetermined feature, the predetermined feature being a cathode terminal having a height G of at least 0.125 inches and substantially equal upper and lower diameters, the diameters being less than those of batteries of the first size not having the predetermined feature, and (b) a battery charger comprising a housing having at least one compartment for receiving batteries, the compartment having at least one wall and a floor, the floor having a support element thereon for supporting at least one battery, the wall having at least one first circular recess disposed therein, the at least one first battery of the first size aligning matingly in respect of and slideably engaging the first circular recess corresponding thereto when positioned on the support element, the first recess having a first diameter slightly larger than the diameter of the cathode terminal of the at least one first battery of the first size, the battery charger further comprising circuit means for supplying a charging current to the at least one first battery of the first size having the predetermined feature, and positive and negative charger contacts for connecting the at least one first battery of the first size having the predetermined feature to the circuit means.

2. The battery charging system of claim 1, wherein the at least one battery of the first size having the predetermined feature is a C-size battery.

3. A battery charging system for charging C-size batteries having a predetermined feature, the battery charger preventing batteries not having the predetermined feature from being charged, comprising:

(a) At least one C-size battery having the predetermined feature, the predetermined feature being a cathode terminal having a height G of at least 0.125 inches and substantially equal upper and lower diameters, the diameters being less than those of C-size batteries not having the predetermined feature and further including an F/N to G ratio of no more than 1.250 and no less than 0.700, and (b) a battery charger comprising a housing having at least one compartment for receiving batteries, the compartment having at least one wall and a floor, the floor having a support element thereon for supporting at least one battery, the wall having at least one first circular recess disposed therein, the at least one C-size battery aligning matingly in respect of and slideably engaging the first circular recess corresponding thereto when positioned on the support element, the first recess having a first diameter slightly larger than the diameter of the cathode terminal of the at least one C-size battery, the battery charger further comprising circuit means for supplying a charging current to the at least one C-size battery having the predetermined feature, and positive and negative charger contacts for connecting the at least one C-size battery having the predetermined feature to the circuit means.

4. The battery charging system of claim 2, wherein the predetermined feature of the least one battery further includes a height G exceeding 0.170 inches.

5. The battery charging system of claim 1, wherein the at least one battery of the first size having the predetermined feature is a D-size battery.

6. A battery charging system for charging D-size batteries having a predetermined feature, the battery charger preventing batteries not having the predetermined feature from being charged, comprising:

(a) at least one D-size battery having the predetermined feature, the predetermined feature being a cathode terminal having a height G of at least 0.125 inches and substantially equal upper and lower diameters, the diameters being less than those of D-size batteries not having the predetermined feature, and further including an F/N to G ratio of no more than 1.620 and no less than 0.700, and (b) a battery charger comprising a housing having at least one compartment for receiving batteries, the compartment having at least one wall and a floor, the floor having a support element thereon for supporting at least one battery, the wall having at least one first circular recess disposed therein, the at least one D-size battery aligning matingly in respect of and slideably engaging the first circular recess corresponding thereto when positioned on the support element, the first recess having a first diameter slightly larger than the diameter of the cathode terminal of the at least one D-size battery, the battery charger further comprising circuit means for supplying a charging current to the at least one D-size battery having the predetermined feature, and positive and negative charger contacts for connecting the at least one D-size battery having the predetermined feature to the circuit means.

7. The battery charging system of claim 5, wherein the predetermined feature of the least one battery further includes a height G exceeding 0.170 inches.

8. The battery charging system of claim 1, wherein the wall further has at least one second circular recess disposed therein, the second circular recess having a second diameter different from the first diameter, the second recess having a second diameter slightly larger than the diameter of the cathode terminal of an at least one second battery of a second size, the at least one second battery of the second size aligning matingly in respect of and slideably engaging the second circular recess corresponding thereto when positioned on the support element, the second size being different from the first size, the battery charger having circuit means for supplying a charging current to the at least one second battery of the second size having the predetermined feature, and positive and negative charger contacts for connecting the at least one second battery of the second size having the predetermined feature to the circuit means.

9. The battery charging system of claim 1, wherein the predetermined feature is indicative of the electrical characteristics of the battery.

10. The battery charging system of claim 1, wherein the housing further has a plurality of compartments for receiving batteries disposed therein.

* * * * *

UNITED STATES PATENT AND TRADEMARK OFFICE
CERTIFICATE OF CORRECTION

PATENT NO. : 5,606,238
DATED : February 25, 1997
INVENTOR(S) : Patrick J. Spellman, El-Sayed A. Megahed, Karl E. Anderson, and Bryan D. Jaedike It is certified that error appears in the above-indentified patent and that said Letters Patent is hereby corrected as shown below:

Column 9, Table 2 of the Patent, "F/N (minimum measured)" should be --F/N (maximum measured)--.

Column 9, Table 2 of the Patent, "G (maximum measured)" should be --G (minimum measured)--.

Column 11, Table 4 of the Patent, "F/N (minimum measured)" should be --F/N (spec. maximum)--.

Column 11, Table 4 of the Patent, "G (maximum measured)" should be --G (spec. minimum)--.

Signed and Sealed this

Twenty-sixth Day of May, 1998

*Attest:*

BRUCE LEHMAN

*Attesting Officer*    Commissioner of Patents and Trademarks